Figure 1:
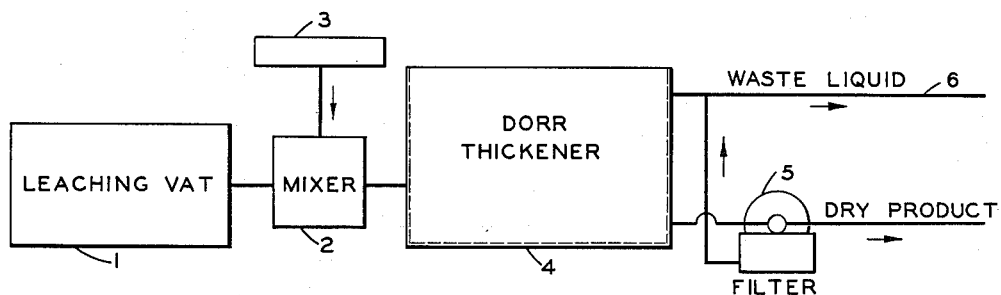

Feb. 21, 1956  W. E. BERGMAN  2,735,858
MANUFACTURE OF QUEBRACHO
Filed June 29, 1951

INVENTOR.
W.E. BERGMAN
BY Hudson + Young
ATTORNEYS

United States Patent Office 2,735,858
Patented Feb. 21, 1956

2,735,858

MANUFACTURE OF QUEBRACHO

William E. Bergman, Bartlesville, Okla., assignor to Phillips Petroleum Company, a corporation of Delaware Application June 29, 1951, Serial No. 234,300

2 Claims. (Cl. 260—448)

This invention relates to an improved method for the preparation of quebracho and related tannins from vegetable matter. In one aspect this invention relates to a method for the preparation of quebracho and related tannins in the form of a drilling mud additive. In another aspect this invention relates to a method for producing a drilling mud additive from an aqueous extract of quebracho and/or other tannins. In still another aspect this invention relates to precipitating quebracho and related tannins from the aqueous extract with a polyvalent metal or the salt of a polyvalent metal in a form suitable for use as a drilling mud additive. In still another aspect this invention relates to a method for drilling an oil or gas well. In still another aspect this invention relates to a drilling mud additive composition.

In recent years quebracho has become important as a drilling mud additive. Quebracho, when used in alkaline condition has the ability of reducing the viscosity of aqueous drilling muds. In the past quebracho has been used principally in the tanning industry and methods of manufacture have been applicable to the demands of the tanning industry. The great increase in the demand for quebracho as a result of its use as a drilling mud additive has been reflected in a scarcity of the product and an increase in its price.

Quebracho is extracted from the bark and wood of the quebracho tree with water. The conventional method of preparing quebracho is to disintegrate the wood and bark, extract the bark and/or wood with water, the solution of quebracho and water is evaporated to 85 per cent concentration of quebracho and the concentrated quebracho is spray dried.

Quebracho is the commercial catechol tannin product obtained as an extract from the quebracho tree in South America. The high tannin content (about 20 per cent) of the wood of the quebracho tree makes it the important source of catechol tannins. The principal source of gallo-tannins is gall nuts. Both catechol tannins and gallo-tannins can be prepared by the practice of this invention to produce a drilling mud additive.

Quebracho is used in the tanning industry in the form in which it is received but when quebracho is used as a drilling mud additive it is usually used with caustic soda (NaOH) in order to achieve the desired degree of viscosity reduction by adjustment of the alkalinity. Sometimes the quebracho is further modified, as for example, by the addition of an inorganic salt of a polyvalent metal to the drilling mud with the caustic and quebracho. This practice results in an improved drilling mud and is disclosed and claimed in copending application Serial Number 61,531, filed November 22, 1948, now Patent 2,636,857, by the same inventor.

Since quebracho is used as a drilling mud additive in modified form it has occurred to me that it would be preferable to prepare quebracho directly from the aqueous extract in the form of a drilling mud additive.

I have discovered that quebracho can be successfully precipitated from the aqueous extract by the addition of certain polyvalent metals or certain of their salts. The precipitate thus obtained can be separated by filtering, centrifuging or other methods. Further the polyvalent metal salt of quebracho thus produced is an excellent drilling mud additive and is superior to sodium tannate which is the active compound resulting from the use of caustic (NaOOH) and quebracho.

Although I refer to quebracho in describing my invention I wish it to be understood that the practice of my invention applies to all other sources of vegetable tannins both catechol tannins and pyrogallol tannins because either can be prepared by my method and either type produces a superior drilling mud additive when produced by the practice of this invention.

Therefore according to the practice of this invention I extract the quebracho or tannins by leaching, with hot water, the ground bark and wood of the tannin containing vegetable material. I then add an inorganic salt of a polyvalent metal to this resulting aqueous extract. This extract will be neutral or slightly acidic. At any rate the pH value will be below that value which would result in complete precipitation of the metal as hydroxide. I then pass the aqueous mixture into a settling zone, for example, a Dorr thickener where the precipitate of metal salt of quebracho settles to the bottom and is drawn off as a slurry and separated from the water phase by centrifuging or filtering. The resulting metal salt of quebracho is ready to be used as a superior drilling mud additive.

By the practice of this invention it is possible to prepare quebracho and related tannins in the form of drilling mud additives at less cost and in less time than by present methods of evaporation. This invention also makes possible the preparation of tannin products from vegetable materials having a much lower tannin content than that of the quebracho tree because the tannins can be precipitated from more dilute solutions or extracts. Other vegetable sources of tannins include: pecan hulls, the wood and bark of chestnut and oak trees, gall nuts, etc.

The polyvalent metals that can be used in the practice of this invention include: aluminum, barium, cadmium, calcium, chromium, cobalt, copper, iron, lead, magnesium, nickel and zinc. The salts of the polyvalent metals that can be used include chlorides and nitrates. Amphoteric salts such as sodium meta aluminate can also be used.

In a preferred embodiment of my invention the ground or shredded wood or bark is leached with hot water by the customary methods employed in leaching vegetable materials. The rich non-alkaline extract produced in the leaching step may be subjected to an evaporation step to increase the concentration of the dissolved tannins or it may be processed as produced in the leaching step. A water soluble salt of a polyvalent metal, e. g. sodium aluminate, is added to the non-alkaline aqueous tannin extract and the resulting precipitate is concentrated in a settling zone, e. g. a Dorr thickener. The clarified aqueous phase from the top of the settler is discarded or processed for re-use. The concentrated aqueous slurry of metal-quebracho is removed from the bottom of the settling zone and may be further dried by a filtering or centrifuging step to produce the improved drilling mud additive of applicant's process.

My invention will be further described in the accompanying diagrammatic drawing which illustrates one embodiment of the invention.

Referring to Figure 1, the ground tannin containing vegetable material is introduced into the leaching zone 1 and is leached with hot water in the conventional manner. The rich aqueous extract is passed to mixer 2 and is there admixed with the inorganic salt of a polyvalent metal which can be added as the dry salt or as an aqueous solution from dispenser 3. The resulting slurry and unreacted solutions are passed from the mixer to a Dorr thickener 4 where the reaction is completed and the metal tannate precipitate is concentrated in the bottom of the thickener. An excess of the metal salt, over that required for the reaction, is added to the mixer to insure complete recovery of the tannins. The concentrated slurry from the bottom of the Dorr thickener is passed to a continuous filter where the dried product is recovered and the filtrate is discarded along with the waste liquid from the top of the Dorr thickener by way of line 6. If desired, the product may be further dried in a kiln (not shown).

Figure 2:
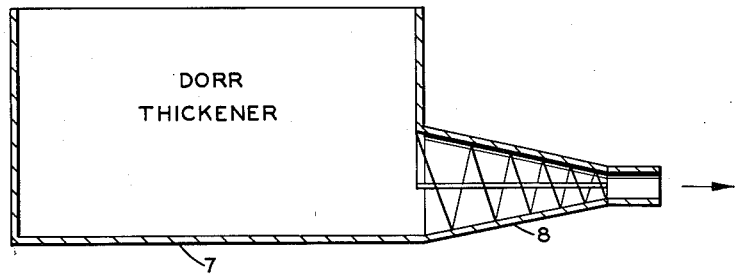

Figure 2 shows an alternate method for removing the water from the concentrated slurry of metal tannate precipitate recovered from the bottom of the Dorr thickener. This method has proved to be successful with the coarser types of metal tannates. The product is removed from the bottom of the Dorr thickener 7 by a tapered screw conveyor 8 in which the liquid is removed from the solids by compression. This product may be further dried if desired.

Reasonable variation and modification are possible within the scope of the foregoing disclosure and the appended claims to the invention the essence of which is an improved method for the preparation of quebracho and other tannins for use as drilling mud additives which comprises precipitating the tannins by the addition of certain polyvalent metals or certain of their inorganic salts to the non-alkaline aqueous solution which contains the tannins extracted from the vegetable matter and separating the precipitate by centrifuging or filtering.

I claim:
1. A method for producing a drilling mud additive which comprises leaching, with water, the quebracho from the ground wood and bark of the quebracho tree; adding sodium meta-aluminate to the resulting non-alkaline aqueous extract; settling the resulting aluminum-quebracho precipitate; and separating, as a drilling mud additive, aluminum-quebracho from the aqueous phase by filtration.

2. A method for producing a drilling mud additive which comprises leaching, with water, the tannins from tannin containing vegetable matter; adding sodium meta-aluminate to the resulting non-alkaline aqueous extract, thus precipitating aluminum tannate; and separating, as a drilling mud additive, aluminum tannate from the aqueous phase.

References Cited in the file of this patent
UNITED STATES PATENTS

| | | |
|---|---|---|
| 517,626 | Reinus | Apr. 8, 1893 |
| 1,516,641 | Ockleston et al. | Nov. 25, 1924 |
| 1,999,766 | Lawton et al. | Apr. 30, 1935 |
| 2,109,858 | Cannon | Mar. 1, 1938 |
| 2,557,657 | Henkes | June 19, 1951 |
| 2,636,857 | Bergman | Apr. 28, 1953 |

FOREIGN PATENTS

| | | |
|---|---|---|
| 957 | Great Britain | 1874 |
| 18,773 | Great Britain | 1907 |
| 479,229 | Germany | July 2, 1929 |